(12) United States Patent  
Kobayashi et al.

(10) Patent No.: US 11,199,255 B2  
(45) Date of Patent: Dec. 14, 2021

(54) ELECTRIC OIL PUMP

(71) Applicant: NIDEC TOSOK CORPORATION, Kanagawa (JP)

(72) Inventors: Yoshiyuki Kobayashi, Kanagawa (JP); Shigehiro Kataoka, Kanagawa (JP); Yutaka Omori, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 253 days.

(21) Appl. No.: 16/357,346

(22) Filed: Mar. 19, 2019

(65) Prior Publication Data  
US 2019/0301596 A1    Oct. 3, 2019

(30) Foreign Application Priority Data

Mar. 30, 2018    (JP) .............................. JP2018-069199

(51) Int. Cl.  
*F16H 61/00* (2006.01)  
*F04C 11/00* (2006.01)  
(Continued)

(52) U.S. Cl.  
CPC ........... *F16H 61/0031* (2013.01); *F04C 2/10* (2013.01); *F04C 2/102* (2013.01); *F04C 11/008* (2013.01); *F04C 13/001* (2013.01); *F04C 15/008* (2013.01); *F04C 2210/206* (2013.01); *F04C 2240/30* (2013.01); *F04C 2240/40* (2013.01); *F04C 2240/803* (2013.01); *F04C 2240/808* (2013.01)

(58) Field of Classification Search  
CPC .. F04C 2/102; F04C 15/008; F04C 2240/808; F04C 2240/40; F04C 11/008; F04C 2240/30; F04C 2240/803; F04C 2/10; F04C 18/0215; F04C 2210/206; F04C 13/001; F16H 61/0031  
See application file for complete search history.

(56) References Cited

U.S. PATENT DOCUMENTS 4,963,778 A * 10/1990 Jensen .................... H02K 5/225  
310/160  
5,491,370 A * 2/1996 Schneider .............. H02K 7/006  
310/54  
(Continued)

FOREIGN PATENT DOCUMENTS

JP    2012029793    2/2012

*Primary Examiner* — Peter J Bertheaud  
(74) *Attorney, Agent, or Firm* — JCIPRNET

(57) ABSTRACT

An electric oil pump includes a motor part having a shaft, a pump part located on a front side of the motor part and driven via the shaft, and a control part controlling the motor part. The motor part includes a rotor, a stator, and a motor housing accommodating the rotor and the stator. The pump part includes a pump rotor mounted on the shaft protruding from the motor part, and a pump housing accommodating the pump rotor. The control part includes a substrate having a surface on which a plurality of electronic components are mounted. The surface of the substrate is disposed to face the cylindrical portion of the motor housing and extends in the axial direction. The substrate has an axial length shorter than an axial length of an assembly of the motor part and the pump part and is disposed within an axial range of the assembly.

7 Claims, 8 Drawing Sheets

(51) Int. Cl.
*F04C 13/00* (2006.01)
*F04C 15/00* (2006.01)
*F04C 2/10* (2006.01)

(56) References Cited

U.S. PATENT DOCUMENTS

| | | | | |
|---|---|---|---|---|
| 5,810,568 A * | 9/1998 | Whitefield | ............... | H02K 7/14 |
| | | | | 417/423.8 |
| 6,808,372 B2 * | 10/2004 | Makino | ................... | F04C 28/08 |
| | | | | 417/410.1 |
| 7,972,123 B2 * | 7/2011 | Koide | ..................... | F04B 35/04 |
| | | | | 417/411 |
| 9,502,945 B2 * | 11/2016 | Okano | ................... | H02K 5/225 |
| 2017/0082104 A1 * | 3/2017 | Yamamoto | ............... | F01C 21/10 |
| 2017/0097001 A1 * | 4/2017 | Ott | ....................... | F04C 15/0065 |

* cited by examiner

ELECTRIC OIL PUMP

CROSS-REFERENCE TO RELATED APPLICATION

This application claims the priority benefit of Japan Application No. 2018-069199, filed on Mar. 30, 2018. The entirety of the above-mentioned patent application is hereby incorporated by reference herein and made a part of this specification.

BACKGROUND

Technical Field

The disclosure relates to an electric oil pump.

Description of Related Art

An electric oil pump having a structure including a pump part, a motor part for driving the pump part, and a control part for controlling an operation of the motor part is known. In this electric oil pump, for example, the pump part is disposed on one side of the motor part in the axial direction, and a shaft extending from the motor part passes through a pump body of the pump part. An accommodating portion which is open on one side of the pump body in the axial direction and recessed toward the other side in the axial direction is provided in an end surface of the pump body on one side in the axial direction. A pump rotor is accommodated in the accommodating portion. Further, the control part has a substrate on which electronic components for driving the motor part are mounted.

Patent Document 1 (Japanese Laid-Open No. 2012-29793) describes a structure of an electronic blood pressure monitor including a pump which introduces air into a cuff attached to a measurement part of a person to be measured, a pump motor which drives the pump, and a substrate which controls the electronic blood pressure monitor. The substrate is disposed above the motor part of the pump motor, and a surface of the substrate on which the electronic components are mounted is disposed along a central axis of the shaft of the pump motor in the axial direction.

An internal space of a housing of the electronic blood pressure monitor described in Patent Document 1 is wider than a size of the pump. Also, the other side of the substrate in the axial direction which is disposed above the pump part is disposed above the pump part in a state in which it protrudes from the other end of the pump part in the axial direction. Therefore, in the pump of the electronic blood pressure monitor described in Patent Document 1, the demand for miniaturization is lower than that of the electric oil pump.

On the other hand, for example, in an electric oil pump applied to a vehicle, the demand for miniaturization is high so as to ensure a minimum ground clearance of the vehicle. Therefore, when the pump and the substrate in the electronic blood pressure monitor described in Patent Document 1 are applied to the electric oil pump, a size of the electric oil pump may be increased.

SUMMARY

According to an exemplary embodiment of the disclosure, there is provided an electric oil pump including a motor part having a shaft disposed along a central axis extending in an axial direction, a pump part located on one side of the motor part in the axial direction and driven by the motor part via the shaft to discharge oil, and a control part which controls an operation of the motor part, wherein the motor part includes a rotor fixed to the other side of the shaft in the axial direction, a stator disposed to face the rotor, and a motor housing having a cylindrical portion which accommodates the rotor and the stator, the pump part includes a pump rotor mounted on the shaft which protrudes from the motor part to one side in the axial direction, and a pump housing having an accommodating portion which accommodates the pump rotor, the control part includes a plurality of electronic components, and a substrate having a surface on which the plurality of electronic components are mounted, the surface of the substrate is disposed radially outward from the cylindrical portion of the motor housing to face the motor housing and extends in the axial direction, and the substrate has an axial length shorter than an axial length of an assembly formed by combining the motor part and the pump part and is disposed within an axial range of the assembly.

DESCRIPTION OF THE EMBODIMENTS

Figure 1:
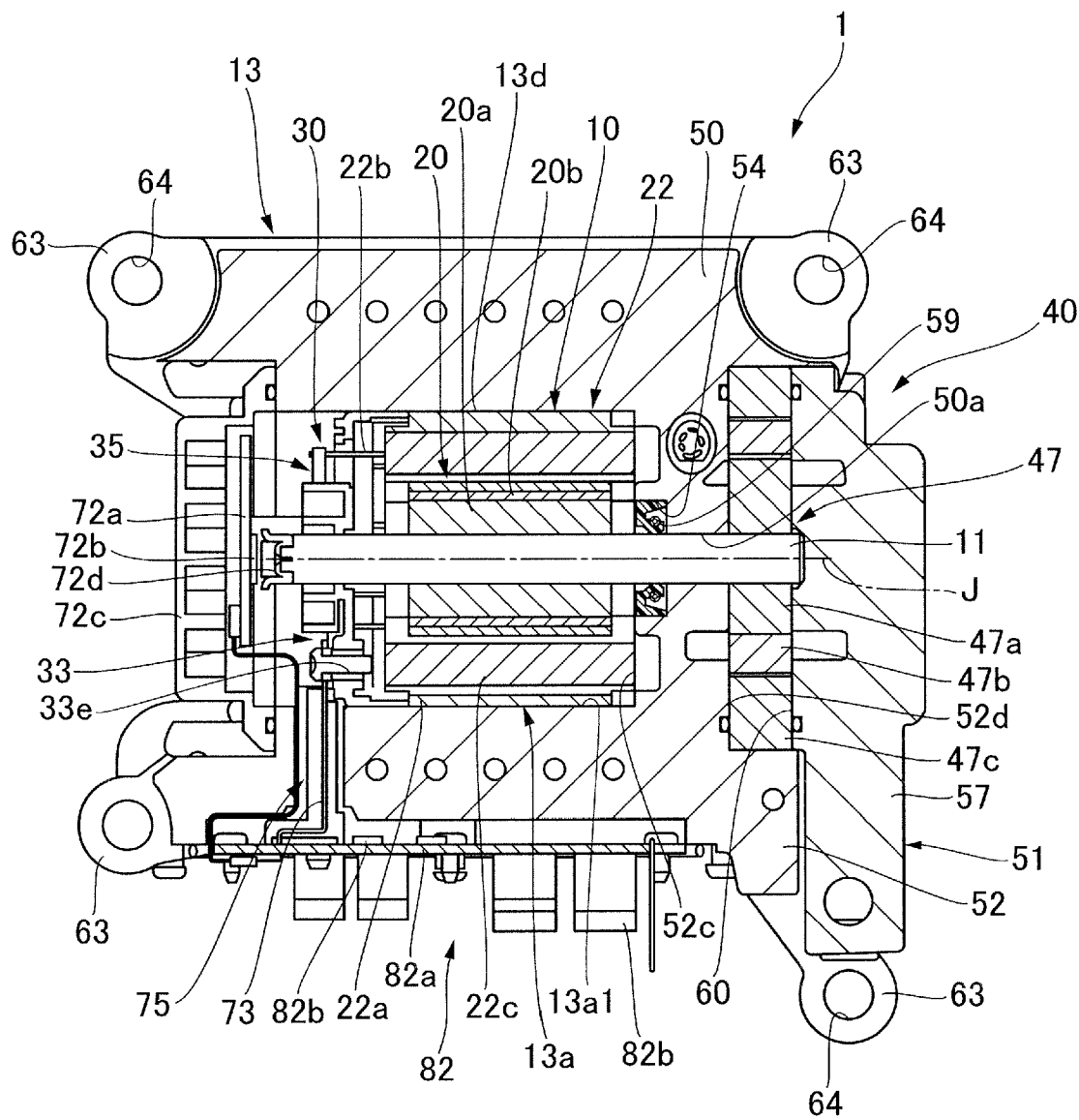
FIG. 1 is a cross-sectional view of an electric oil pump according to a first embodiment.

The disclosure provides an electric oil pump having a substrate and capable of being downsized in an axial direction.

According to the exemplary embodiment of the disclosure, it is possible to provide an electric oil pump having a substrate and capable of being downsized in an axial direction.

Hereinafter, an electric oil pump according to an embodiment of the disclosure will be described with reference to the drawings. In the embodiment, an electric oil pump which supplies oil to a transmission mounted in a vehicle such as an automobile will be described. Further, in the following drawings, to make each configuration easy to understand, the actual structure and the scale and number in each structure may be different from each other.

Further, in the drawings, an XYZ coordinate system is appropriately shown as a three-dimensional orthogonal coordinate system. In the XYZ coordinate system, a Z axis direction is a direction (a right and left direction in FIG. 1) parallel to an axial direction of a central axis J shown in FIG. 1. An X axis direction is a direction parallel to a short side direction of the electric oil pump shown in FIG. 1, that is, a direction orthogonal to the paper surface of FIG. 1. A Y axis direction is a direction orthogonal to both the X axis direction and the Z axis direction.

Further, in the following description, a positive side (+Z side) in the Z axis direction is referred to as a "rear side," and a negative side in the Z axis direction (−Z side) is referred to as a "front side." The rear side and the front side are simply used for explanation and do not limit an actual positional relationship and direction. Also, unless otherwise noted, the direction (the Z axis direction) parallel to the central axis J is simply referred to as an "axial direction," a radial direction around the central axis J is simply referred to as a "radial direction," and a circumferential direction around the central axis J, that is, an axial circumference (a θ direction) of the central axis J is simply referred to as a "circumferential direction."

In the specification, the term "extending in the axial direction" includes not only a case of strictly extending in the axial direction (the Z axis direction) but also a case of extending in a direction inclined in a range of less than 45° with respect to the axial direction. Also, in the specification, the term "extending in the radial direction" includes not only a case of strictly extending in the radial direction, that is, in a direction perpendicular to the axial direction (the Z axis direction) but also a case of extending in a direction inclined in a range of less than 45° with respect to the radial direction.

First Embodiment

<Entire Configuration>

Figure 2:
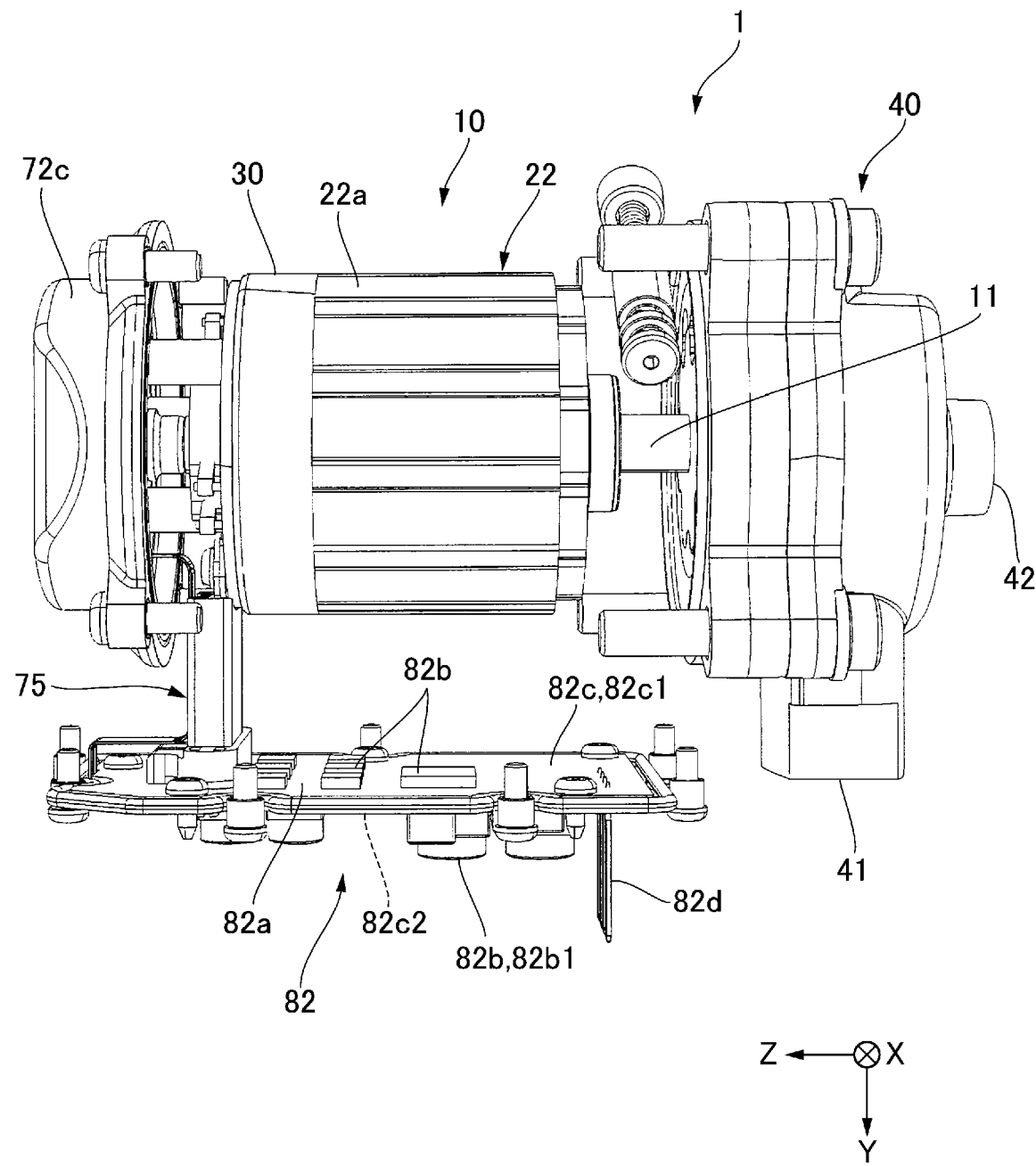
FIG. 2 is an internal structural view of the electric oil pump in which illustration of a motor housing is omitted.

FIG. 1 is a cross-sectional view of an electric oil pump according to a first embodiment. FIG. 2 is an internal structural view of the electric oil pump in which illustration of a motor housing is omitted. As shown in FIGS. 1 and 2, the electric oil pump 1 of the embodiment includes a motor part 10, a pump part 40, and a control part 82. The motor part 10 has a shaft 11 disposed along the central axis J extending in the axial direction. The pump part 40 is located on one side (the front side) of the motor part 10 in the axial direction, is driven by the motor part 10 via the shaft 11 and discharges oil. The control part 82 is disposed on the +Y side of the motor part 10 and controls an operation of the motor part 10. Hereinafter, each element will be described in detail.

<Motor Part 10>

As shown in FIG. 1, the motor part 10 includes the shaft 11, a rotor 20, a stator 22, a cylindrical portion 13d of a motor housing 13, and a coil 22b.

The motor part 10 is, for example, an inner rotor type motor. The rotor 20 is fixed to an outer circumferential surface of the shaft 11, and the stator 22 is disposed radially outward from the rotor 20. The rotor 20 is fixed to the other side (the rear side) of the shaft 11 in the axial direction. The stator 22 is disposed to face the rotor 20.

(Motor Housing 13)

As shown in FIG. 1, the motor housing 13 includes the cylindrical portion 13d which has a cylindrical shape and covers the stator 22, and a case 50 which extends from an outer surface of the cylindrical portion 13d in a direction (the Y axis direction) orthogonal to the axial direction. The cylindrical portion 13d accommodates the rotor 20 and the stator 22. The motor housing 13 has a stator holding portion 13a. The motor housing 13 is formed of a metal. The cylindrical portion 13d and the case 50 are integrally molded. Therefore, the cylindrical portion 13d and the case 50 are a single member. A motor cover 72c is disposed at an end of the cylindrical portion 13d on the other side (the rear side) in the axial direction, and a rear side opening of the cylindrical portion 13d is closed by the motor cover 72c. Further, the motor housing 13 has a bus bar assembly 30 which is connected to the coil 22b extending from the stator 22.

(Stator Holding Portion 13a)

The stator holding portion 13a has a cylindrical shape which extends in the axial direction. The shaft 11 of the motor part 10, the rotor 20 and the stator 22 are disposed in the stator holding portion 13a. An outer surface of the stator 22, that is, an outer surface of a core back portion 22a which will be described later is fitted to an inner surface 13a1 of the stator holding portion 13a. Accordingly, the stator 22 is accommodated in the stator holding portion 13a.

(Bus Bar Assembly 30)

Figure 3:
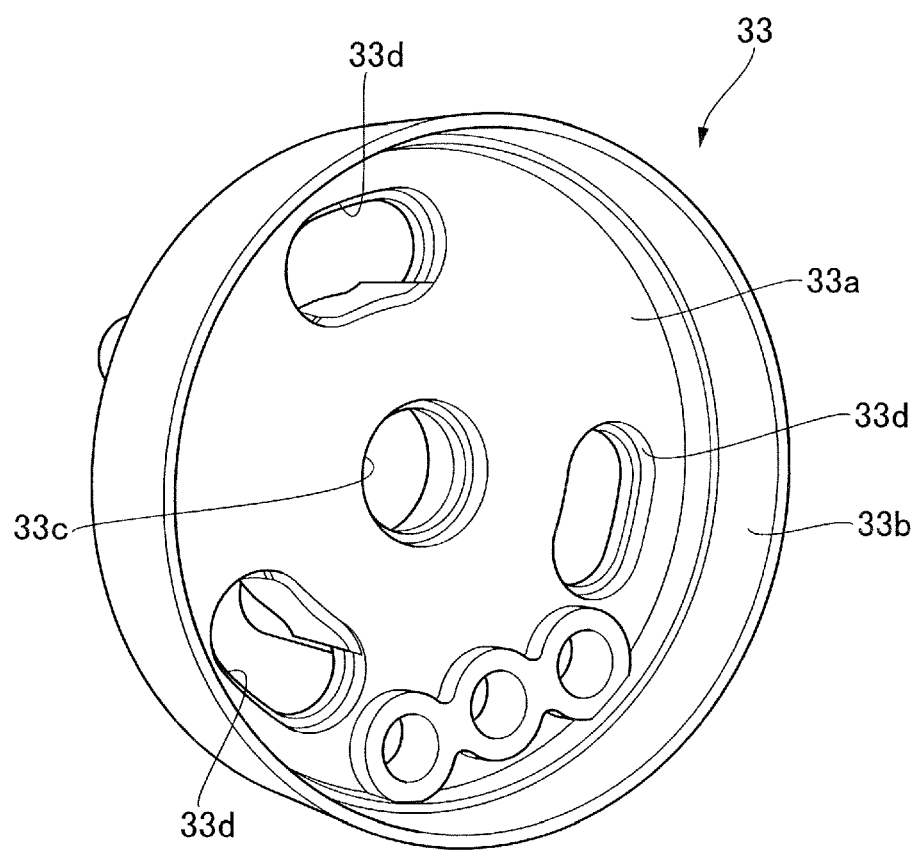
FIG. 3 is a perspective view of an assembly main body portion.
Figure 4:
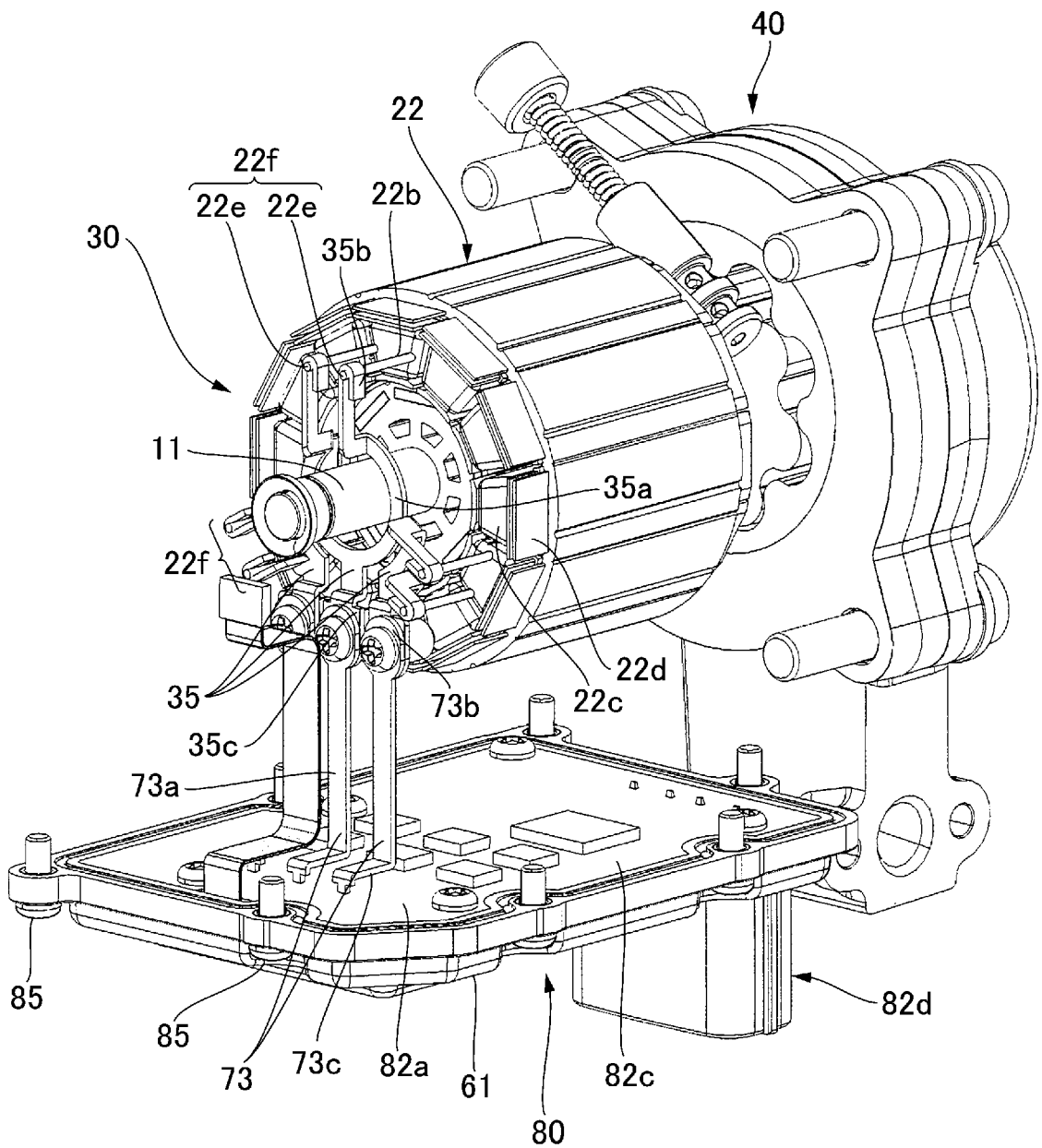
FIG. 4 is an internal structural view of the electric oil pump in which illustration of the motor housing and an assembly main body portion is omitted.

FIG. 3 is a perspective view of an assembly main body portion. FIG. 4 is an internal structural view of the electric oil pump 1 in which illustration of the motor housing 13 and an assembly main body portion 33 is omitted. As shown in FIGS. 3 and 4, the bus bar assembly 30 is connected to a coil end 22e of the coil 22b extending from the stator 22. A connecting bus bar 35 of the bus bar assembly 30 is connected to a bus bar 73 connected to a substrate 82a. Therefore, the coil end 22e is electrically connected to the substrate 82a via the bus bar assembly 30.

The bus bar assembly 30 includes a plurality of connecting bus bars 35 which have a tubular shape and are connected to the coil ends 22e, and the assembly main body portion 33 in which the connecting bus bars 35 are disposed. In the embodiment, the connecting bus bar 35 is formed of a metal and is integrated with the assembly main body portion 33 by insert molding.

The coil end 22e protrudes from an end of the motor part 10 on the other side (the rear side) in the axial direction. Assuming that two coil ends 22e which are adjacent to each other in the circumferential direction are one coil end group 22f, three coil end groups 22f are disposed at regular intervals in the circumferential direction. Therefore, the bus bar assembly 30 has three connecting bus bars 35 connected to the three coil end groups 22f, respectively.

(Connecting Bus Bar 35)

The connecting bus bar 35 includes a bus bar main body portion 35a curved on a radially outer side of the shaft 11 in the circumferential direction, a coil end side connection portion 35b connected to one end portion of the bus bar main body portion 35a and connected to the coil end 22e, and a substrate-side connection portion 35c connected to the other end of the bus bar main body portion 35a and connected to the bus bar 73 connected to the substrate 82a.

(Assembly Main Body Portion 33)

As shown in FIGS. 1 and 3, the assembly main body portion 33 has a tubular portion 33b which has a tubular shape and extends in a cylindrical shape. The tubular portion 33b is open on one side (the front side) in the axial direction and has a bottom portion 33a on the rear side. An insertion hole 33c through which the shaft 11 passes is provided at a center portion of the bottom portion 33a. An inner diameter of the insertion hole 33c is larger than an outer diameter of the shaft 11. Therefore, the insertion hole 33c is capable of suppressing shaking of the rear side of the shaft 11. The bus bar assembly 30 is fixed to the inner surface 13a1 of the cylindrical portion 13d of the motor housing 13. In the present embodiment, the bus bar assembly 30 is fixed to the inner surface 13a1 of the motor housing 13 by press fitting.

As shown in FIG. 3, the assembly main body portion 33 has a plurality of exposed through holes 33d provided at regular intervals in a circumferential edge portion of the bottom portion 33a of the assembly main body portion 33 in the circumferential direction. Each of the exposed through holes 33d exposes the coil end side connection portion 35b of the connecting bus bar 35 when seen in the axial direction. In the embodiment, each of the exposed through holes 33d has a long hole shape curved and extending in the circumferential direction when seen from the rear side.

The assembly main body portion 33 has a female threaded portion 33e for screwing a bolt between the exposed through holes 33d which are the circumferential edge portion of the bottom portion 33a and are adjacent to each other in the circumferential direction. In the embodiment, the three female threaded portions 33e are linearly disposed in the X axis direction when seen in the axial direction. Each of the female threaded portions 33e has an insert.

(Bus Bar 73)

As shown in FIG. 4, the bus bar 73 connects the connecting bus bar 35 with the substrate 82a. The bus bar 73 includes a bus bar main body portion 73a, a connecting bus bar side terminal portion 73b provided on one end side of the bus bar main body portion 73a and connected to the connecting bus bar 35, and a substrate-side terminal portion 73c provided on the other end side of the bus bar main body portion 73a and connected to the substrate 82a. The bus bar main body portion 73a and the connecting bus bar side terminal portion 73b linearly extend radially outward from the substrate-side connection portion 35c of the connecting bus bar 35. The other end side of the bus bar main body portion 73a is bent toward the rear side and extends in the axial direction. The substrate-side connection portion 35c is bent from the other end of the bus bar main body portion 35a and linearly extends radially outward. The substrate-side connection portion 35c is electrically connected through a through hole provided in the substrate 82a.

(Rotor 20)

As shown in FIG. 1, the rotor 20 is fixed to the rear side of the shaft 11 with respect to the pump part 40. The rotor 20 has a rotor core 20a and a rotor magnet 20b. The rotor core 20a surrounds the shaft 11 around the axis (in the θ direction) and is fixed to the shaft 11. The rotor magnet 20b is fixed to an outer surface of the rotor core 20a around the axis (in the θ direction). The rotor core 20a and the rotor magnet 20b rotate together with the shaft 11. Incidentally, the rotor 20 may be an embedded magnet type in which a permanent magnet is embedded in the rotor 20. The embedded magnet type rotor 20 can reduce possibility that the magnet is separated by a centrifugal force and can positively use a reluctance torque, as compared with a surface magnet type in which the permanent magnet is provided on the surface of the rotor 20.

(Stator 22)

The stator 22 is disposed radially outward from the rotor 20 to face the rotor 20, surrounds the rotor 20 around the axis (in the θ direction) and rotates the rotor 20 around the central axis J. The stator 22 has a core back portion 22a, a tooth portion 22c, a coil 22b, and an insulator (a bobbin) 22d.

The core back portion 22a has a cylindrical shape which is concentric with the shaft 11. The tooth portion 22c extends from an inner surface of the core back portion 22a toward the shaft 11. A plurality of the tooth portions 22c are provided and disposed at regular intervals in the circumferential direction of the inner surface of the core back portion 22a. The coil 22b is wound around the insulator 22d. The insulator 22d is mounted on each of the tooth portions 22c.

(Shaft 11)

As shown in FIG. 1, the shaft 11 extends around the central axis J extending in the axial direction and passes through the motor part 10. The front side (the −Z side) of the shaft 11 protrudes from the motor part 10 and extends into the pump part 40. The front side of the shaft 11 is fixed to an inner rotor 47a of the pump part 40. The front side of the shaft 11 passes through and is supported by a bearing through hole 50a provided on the front side of the case 50 of the motor housing 13. That is, the bearing through hole 50a serves as a sliding bearing which rotatably supports the shaft 11. Details of the bearing through hole 50a will be described later.

The rear side of the shaft 11 passes through the insertion hole 33c of the bus bar assembly 30, but the insertion hole 33c does not serve as a bearing. Therefore, the rotor 20 rotates in a cantilever supported state in which only the front side thereof is supported.

<Control Part 82>

As shown in FIGS. 1 and 2, the control part 82 includes a plurality of electronic components 82b and the substrate 82a having a surface on which the plurality of electronic components 82b are mounted. The control part 82 generates a signal for driving the motor part 10 and outputs the signal to the motor part 10. The substrate 82a is accommodated in the case 50 and is supported by and fixed to the bus bar assembly 75 extending radially outward from the cylindrical portion 13d of the motor housing 13.

As shown in FIG. 1, a rotation angle sensor 72b which detects a rotation angle of the shaft 11 is disposed at a position which is inside the motor cover 72c and faces a rear side end of the shaft 11. The rotation angle sensor 72b is mounted on a circuit board 72a. The circuit board 72a is supported by and fixed to a substrate support portion (not shown) fixed to a rear side end of the motor housing 13. A rotation angle sensor magnet 72d is disposed and fixed at the rear side end of the shaft 11. The rotation angle sensor 72b is disposed on the rear side of the rotation angle sensor magnet 72d to face the rotation angle sensor magnet 72d. When the shaft 11 rotates, the rotation angle sensor magnet 72d also rotates, and thus a magnetic flux changes. The rotation angle sensor 72b detects a change in the magnetic flux caused by rotation of the rotation angle sensor magnet 72d and thus detects the rotation angle of the shaft 11.

<Pump Part 40>

As shown in FIG. 1, the pump part 40 is located on one side (the front side) of the motor part 10 in the axial direction. The pump part 40 is driven by the motor part 10 via the shaft 11. The pump part 40 includes a pump rotor 47 and a pump housing 51. In the embodiment, the pump housing 51 includes a pump body 52 and a pump cover 57. The pump housing 51 has an accommodating portion 60 which accommodates the pump rotor 47 between the pump body 52 and the pump cover 57. Each part will be described in detail below.

(Pump Body 52)

As shown in FIG. 1, the pump body 52 is disposed at a front side end of the motor housing 13. The pump body 52 is integrally molded with the case 50. Therefore, the pump body 52 and the case 50 are the same member. The pump body 52 has a concave portion 54 which is recessed from an end surface 52c thereof on the rear side (the +Z side) toward the front side (the −Z side). A seal member 59 is accommodated in the concave portion 54. The seal member 59 seals oil leaking from the pump rotor 47. The pump body 52 is the same member as the motor housing 13.

The pump body 52 has the bearing through hole 50a passing therethrough along the central axis J. In the bearing through hole 50a, both ends thereof in the axial direction are open, the shaft 11 passes therethrough, an opening thereof on the rear side (the +Z side) is open in the concave portion 54, and an opening thereof on the front side (the −Z side) is open in a front end surface 52d of the pump body 52. This bearing through hole 50a is a sliding bearing which rotatably supports the shaft 11.

(Pump Rotor 47)

As shown in FIG. 1, the pump rotor 47 is mounted on the front side of the shaft 11. The pump rotor 47 includes an inner rotor 47a, an outer rotor 47b, and a rotor body 47c. The pump rotor 47 is mounted on the shaft 11. More specifically, the pump rotor 47 is mounted on the front side (the −Z side) of the shaft 11. The inner rotor 47a is fixed to the shaft 11. The outer rotor 47b surrounds the outer side of the inner rotor 47a in the radial direction. The rotor body 47c surrounds the outer side of the outer rotor 47b in the radial direction. The rotor body 47c is fixed to the pump body 52.

The inner rotor 47a has an annular shape. The inner rotor 47a is a gear having teeth on a radially outer side surface thereof. The inner rotor 47a rotates around the axis (in the θ direction) together with the shaft 11. The outer rotor 47b has an annular shape which surrounds a radially outer side of the inner rotor 47a. The outer rotor 47b is a gear having teeth on a radially inner surface thereof. A radially outer side surface of the outer rotor 47b has a circular shape. A radially inner side surface of the rotor body 47c has a circular shape.

The gear on the radially outer side surface of the inner rotor 47a and the gear on the radially inner side surface of the outer rotor 47b engage with each other, and the inner rotor 47a is rotated by the shaft 11, and thus the outer rotor 47b rotates. That is, the pump rotor 47 is rotated by the rotation of the shaft 11. In other words, the motor part 10 and the pump part 40 have the same rotation axis. Accordingly, it is possible to suppress a size of the electric oil pump 1 from increasing in the axial direction.

Also, as the inner rotor 47a and the outer rotor 47b rotate, a volume between engagement portions of the inner rotor 47a and the outer rotor 47b changes. A region in which the volume decreases becomes a pressurization region, and a region in which the volume increases is a negative pressure region. A suction port (not shown) of the pump cover 57 is disposed on the front side of the negative pressure region of the pump rotor 47. Further, a discharge port (not shown) of the pump cover 57 is disposed on the front side of the pressurization region of the pump rotor 47.

(Pump Cover 57)

As shown in FIG. 1, the pump cover 57 is mounted on the front side of the pump rotor 47. The pump cover 57 is fixed to the rotor body 47c of the pump rotor 47. The pump cover 57 is mounted on and fixed to the pump body 52 together with the rotor body 47c of the pump rotor 47. The pump cover 57 has an inlet 41 (refer to FIG. 2) connected to the suction port. The pump cover 57 has an outlet 42 (refer to FIG. 2) connected to the discharge port.

Oil suctioned into the pump rotor 47 from the inlet 41 provided in the pump cover 57 via the suction port of the pump cover 57 is accommodated in a volume portion between the inner rotor 47a and the outer rotor 47b and is delivered to the pressurization region. Thereafter, the oil is discharged from the outlet 42 provided in the pump cover 57 via the discharge port of the pump cover 57. A suction direction in the inlet 41 and a discharge direction in the outlet 42 are orthogonal to each other. Accordingly, it is possible to reduce a pressure loss from the inlet to the outlet and to make a flow of the oil smooth.

As shown in FIG. 2, the inlet is disposed on the side in which the substrate 82a is disposed with respect to the motor part 10. Thus, it is possible to reduce a size of the electric oil pump 1 in the radial direction by overlapping an arrangement space of the inlet 41 with an arrangement space of the substrate 82a and minimizing the arrangement space which is separately required.

(Case 50)

Figure 5:
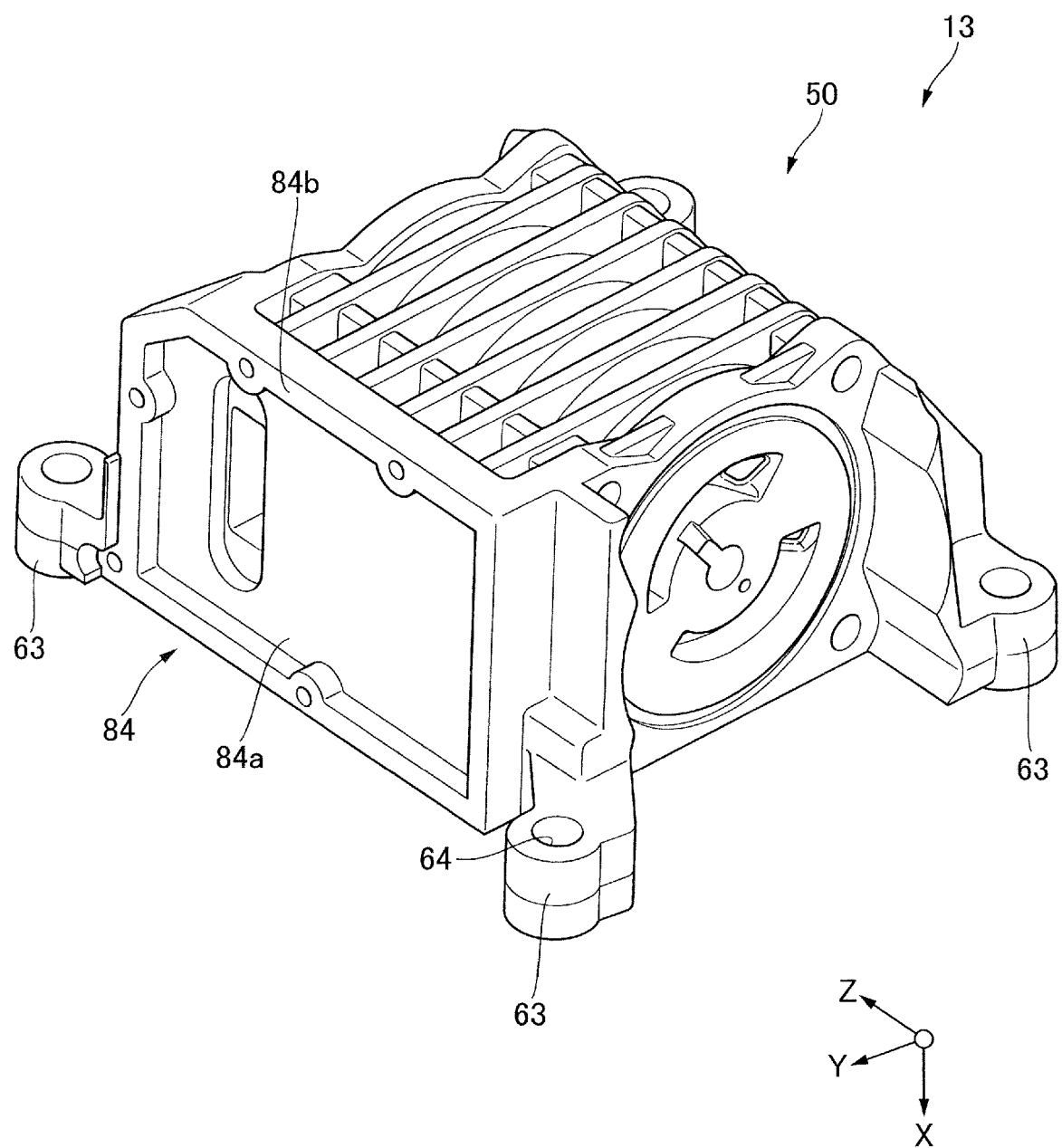
FIG. 5 is a perspective view of a motor housing.

FIG. 5 is a perspective view of the motor housing 13. The motor housing 13 includes the cylindrical portion 13d and the case 50. As shown in FIGS. 1 and 5, the motor housing 13 is formed in a rectangular parallelepiped shape and has the cylindrical portion 13d extending in the axial direction thereof. The cylindrical portion 13d has the end surface 52c in which the rear side thereof is open and the front side thereof is closed. Therefore, the cylindrical portion 13d is a cylinder having a bottom. The bearing through hole 50a which is formed in the axial direction and through which the shaft 11 passes is provided in the end surface 52c.

The case 50 is a portion of the motor housing 13 outside the cylindrical portion 13d. The case 50 has a substrate accommodating portion 84 which is located radially outward from the cylindrical portion 13d, extends in the axial direction and accommodates the substrate 82a. Further, the assembly 45 refers to a combination of the motor part 10 and the pump part 40. The substrate accommodating portion 84 has a placing surface portion 84a which is disposed within an axial range of an assembly 45 to face the cylindrical portion 13d and on which the substrate 82a is placed. In the embodiment, the substrate accommodating portion 84 is located on the +Y side from the cylindrical portion 13d, and the placing surface portion 84a is disposed to face the cylindrical portion 13d. The placing surface portion 84a extends in the axial direction and the X axis direction. That is, the placing surface portion 84a extends in a direction orthogonal to the Y axis direction. Therefore, it is possible to suppress an increase in the size of the electric oil pump 1 in the Y axis direction.

The substrate accommodating portion 84 is in the form of a bottomed container which is recessed toward the cylindrical portion 13d and includes the placing surface portion 84a which extends in a planar shape in the axial direction and an annular protruding portion 84b which protrudes toward the +Y side from a circumferential edge portion of the placing surface portion 84a. The placing surface portion 84a has a rectangular shape as seen in a direction of the −Y side. The substrate 82a is accommodated in the substrate accommodating portion 84.

(Substrate 82a)

As shown in FIGS. 1 and 2, a surface of the substrate 82a is disposed on a radially outer side of the cylindrical portion 13d of the motor housing 13 to face the cylindrical portion 13d of the motor housing 13 and extends in the axial direction. Further, the substrate 82a has an axial length shorter than an axial length of the assembly 45 formed by combining the motor part 10 and the pump part 40 and is disposed within an axial range of the assembly 45. In the embodiment, the substrate 82a is formed in a rectangular shape and has a similar shape smaller than the placing surface portion 84a of the substrate accommodating portion 84. In the substrate 82a, the surface 82c of the substrate 82a is disposed along the placing surface portion 84a of the substrate accommodating portion 84. Therefore, the surface 82c of the substrate 82a is disposed to face the cylindrical portion 13d of the motor housing 13. Also, in the substrate 82a, a front side end of the substrate 82a is located on the front side of the assembly 45, and a rear side end of the substrate 82a is located on the rear side of the assembly 45. Therefore, the axial length of the substrate 82a is shorter than the axial length of the assembly 45, and the substrate 82a is disposed within the axial range of the assembly 45. Accordingly, a length of the electric oil pump 1 in the axial direction is suppressed, and the size thereof can be reduced.

The substrate 82a has the surface 82c on which the plurality of electronic components 82b are mounted. In the embodiment, the substrate 82a is formed in a plate shape and has planar surfaces 82c on both sides thereof in the Y axis direction. The electronic components 82b are mounted on these surfaces 82c. The plurality of electronic components 82b mounted on the substrate 82a are disposed on the substrate 82a to face the cylindrical portion 13d of the motor housing 13. In the embodiment, the electronic components 82b are disposed in the Y axis direction. Also, among the plurality of electronic components 82b, an electronic component 82b1 having a relatively high height is mounted on a front side surface 82c2 of the surfaces 82c of the substrate 82a opposite to a rear side surface 82c1 facing the motor part 10. In the embodiment, the electronic component 82b1 having a relatively high height is a capacitor. The electronic component 82b1 having a relatively high height may be a choke coil. Therefore, it is possible to increase a distance between the motor part 10 and the electronic component 82b1 having a relatively high height. Thus, adverse influence on the electronic component 82b1 due to heat generation from the motor part 10 can be suppressed.

A connector portion 82d electrically connected to the substrate 82a is provided on one side (the front side) of the substrate 82a in the axial direction. On the other hand, the bus bar 73 of the bus bar assembly 75 is electrically connected to the other side (the rear side) of the substrate 82a in the axial direction. In the embodiment, the connector portion 82d is a connection terminal. The connector portion 82d extends from the front side surface 82c2 of the front side end of the substrate 82a in the Y axis direction. A plurality of the connector portions 82d are disposed at intervals in the X axis direction. That is, the connector portions 82d have a plurality of connection terminals. Therefore, the connector portions 82d may be disposed at positions away from a connection point in which the bus bar 73 is connected to the substrate 82a. Therefore, it is possible to suppress the possibility that noise generated from the bus bar 73 adversely affects the connector portions 82d.

(Substrate Cover 61)

Figure 6:
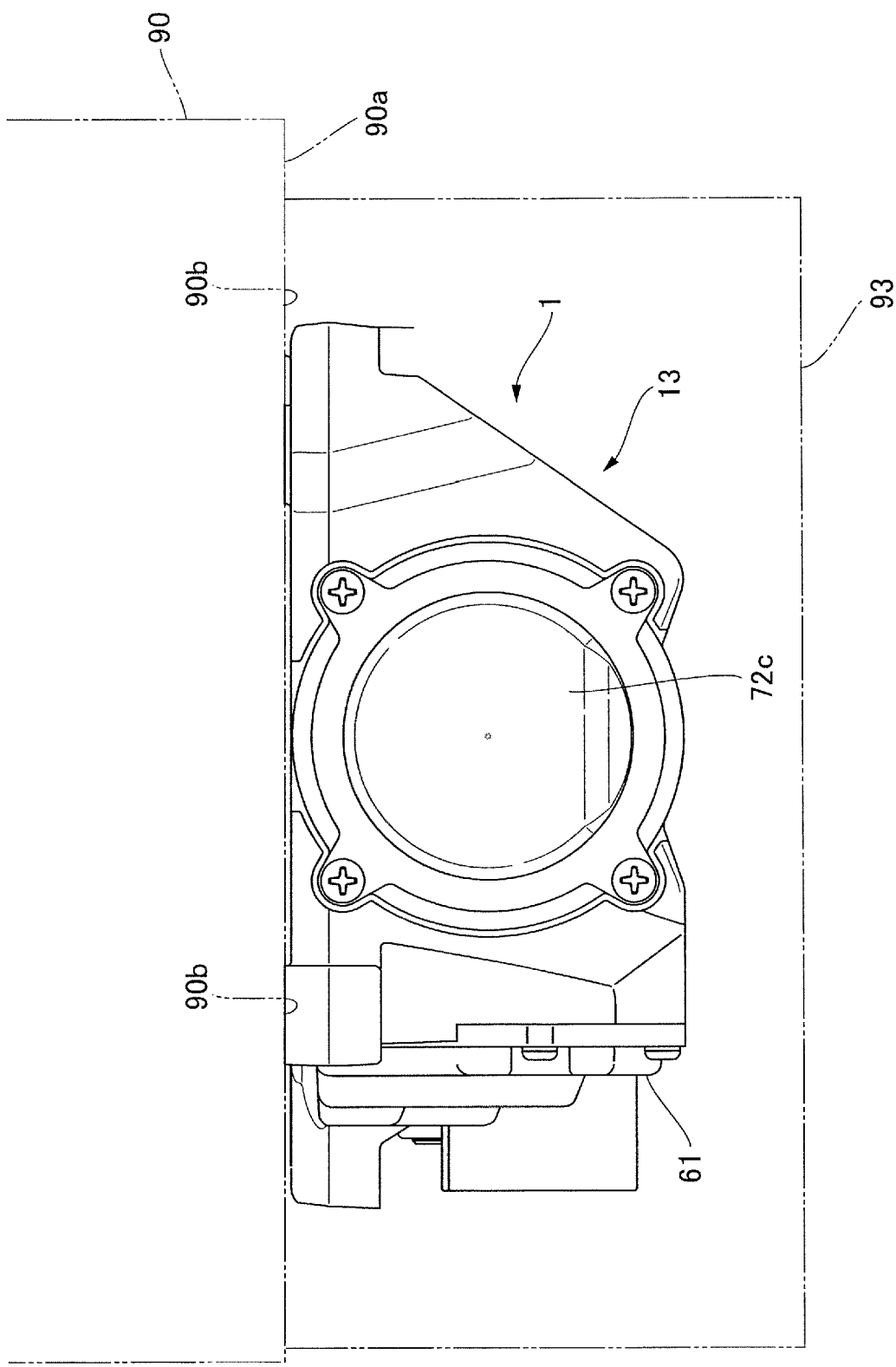
FIG. 6 is a side view of the electric oil pump.

FIG. 6 is a side view of the electric oil pump. As shown in FIGS. 4 and 6, a substrate cover 61 is disposed in an opening of the substrate accommodating portion 84 and closes the opening of the substrate accommodating portion 84. The substrate cover 61 is disposed parallel to the substrate 82a. Therefore, the electric oil pump 1 can be downsized in a direction (the Y direction) orthogonal to the axial direction. The substrate cover 61 has a plurality of fixing portions 85 fixed to the case 50. In the embodiment, the fixing portions 85 are bolts.

Figure 7:
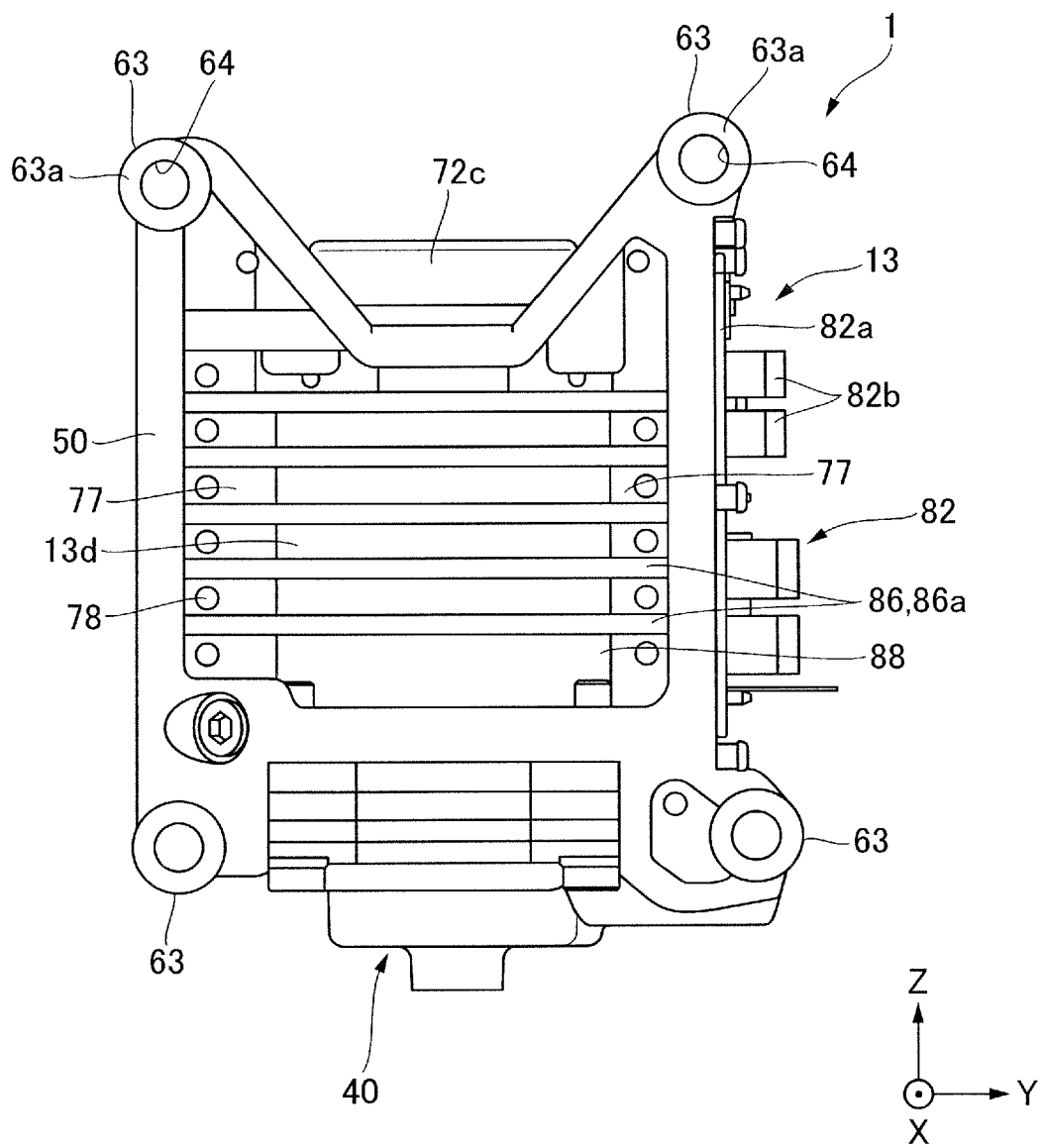
FIG. 7 is a plan view of the electric oil pump.

FIG. 7 is a plan view of the electric oil pump 1. As shown in FIG. 6, the electric oil pump 1 is mounted on a mounting surface 90b provided on a lower surface 90a of a transmission 90. The electric oil pump 1 is accommodated in an oil pan 93 provided below the transmission 90. The electric oil pump 1 suctions oil in the oil pan 93 from the inlet 41 and discharges it from the outlet 42.

(Mounting Portion 63)

As shown in FIG. 7, the case 50 of the electric oil pump 1 has a plurality of mounting portions 63 to be attached to the mounting surface 90b of the transmission 90. In the embodiment, the mounting portions 63 are provided at a corner portion of the case 50 as seen in a −X side direction.

Each of the mounting portions 63 has a mounting through hole 64 in a center thereof. In the electric oil pump 1, a bolt (not shown) passes through the mounting through hole 64, and the electric oil pump 1 is mounted on the mounting surface 90b of the transmission 90 using this bolt. Each of the mounting portions 63 has a flat surface portion 63a which comes into contact with the mounting surface 90b when the electric oil pump 1 is mounted on the mounting surface 90b.

(Radiation Fin 86)

Figure 8:
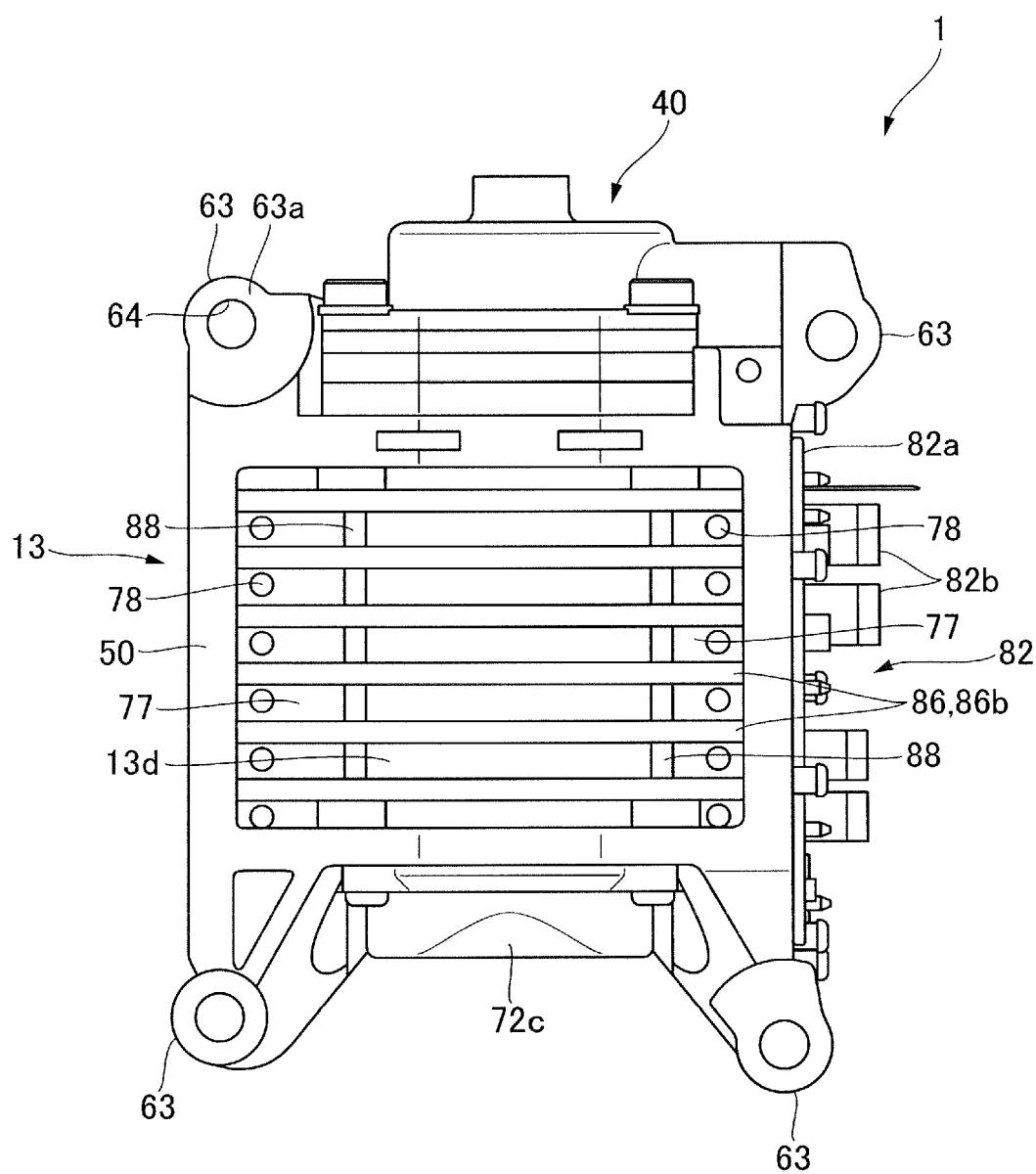
FIG. 8 is a rear view of the electric oil pump.

FIG. 8 is a rear view of the electric oil pump 1. As shown in FIGS. 7 and 8, the case 50 has a plurality of radiation fins 86 which extend radially outward from the outer surface of the cylindrical portion 13d of the motor housing 13 and extend in a direction intersecting the axial direction. In the embodiment, the plurality of radiation fins 86 protrude in the X axis direction and extend in the Y axis direction on both +X side and −X side of the outer surface of the cylindrical portion 13d of the motor housing 13. The plurality of radiation fins 86 are disposed at intervals in the axial direction.

Radiation fins 86a provided on the +X side of the outer surface of the cylindrical portion 13d of the motor housing 13 and radiation fins 86b provided on the −X side thereof are disposed on the same plane in the X axis direction. Therefore, the radiation fins 86a and 86b extending radially outward from the cylindrical portion 13d are connected in the X axis direction. Heat from the substrate 82a and the motor part 10 can be dissipated by these radiation fins 86.

(Support Portion 77)

As shown in FIGS. 7 and 8, the case 50 has a support portion 77 which extends radially outward from the outer surface of the cylindrical portion 13d of the motor housing 13 and connects a pair of radiation fins 86 adjacent to each other in the axial direction. In the embodiment, the support portion 77 is provided between a pair of radiation fins 86 which extend radially outward from the outer surface of the cylindrical portion 13d of the motor housing 13 and are adjacent to each other in the axial direction. The support portion 77 extends between the pair of radiation fins 86 in a plate shape in a direction (the Y axis direction) orthogonal to the axial direction. Further, the support portion 77 has an inter-fin through hole 78 which extends in a direction intersecting the flat surface portion 63a of the mounting portion 63 and passes through the support portion 77. In the embodiment, the inter-fin through hole 78 extends in a direction orthogonal to the flat surface portion 63a. Therefore, when the mounting portion 63 is mounted on the mounting surface 90b of the transmission 90, the inter-fin through hole 78 can be oriented in a vertical direction. Accordingly, it is possible to easily allow the oil to flow downward through the inter-fin through hole 78.

As shown in FIG. 8, the case 50 has a rib 88 which connects the pair of radiation fins 86 adjacent to each other in the axial direction. In the embodiment, the rib 88 extends between the pair of radiation fins 86 adjacent to each other in the axial direction from the outer surface of the cylindrical portion 13d of the motor housing 13 in the X axis direction. Thus, the radiation fins 86 are connected to the other radiation fins 86 adjacent to each other in the axial direction via the ribs 88 and also connected to the cylindrical portion 13d. Therefore, the plurality of radiation fins 86 can further enhance rigidity through the ribs 88.

<Operation and Effect of Electric Oil Pump 1>

Next, the operation and effect of the electric oil pump 1 will be described. As shown in FIGS. 1 and 2, when the motor part 10 of the electric oil pump 1 is driven, the shaft 11 of the motor part rotates, and the outer rotor 47b also rotates as the inner rotor 47a of the pump rotor 47 rotates. When the pump rotor 47 rotates, the oil suctioned from the inlet 41 of the pump part 40 moves through the accommodating portion 60 of the pump part 40 and is discharged from the outlet 42.

(1) Here, in the electric oil pump 1 according to the embodiment, as shown in FIG. 1, the surface 82*c* of the substrate 82*a* is disposed on the radially outer side of the cylindrical portion 13*d* of the motor housing 13 to face the cylindrical portion 13*d* of the motor housing 13 and extends in the axial direction. Also, the substrate 82*a* has the axial length shorter than the axial length of the assembly 45 formed by combining the motor part 10 and the pump part 40 and is thus disposed within the axial range of the assembly 45. Therefore, the substrate 82*a* does not protrude axially outward from the electric oil pump 1 in the axial direction. Further, the size of the substrate 82*a* protruding radially outward from the motor part 10 can be suppressed. Therefore, the electric oil pump 1 can be downsized.

(2) Further, the plurality of electronic components 82*b* mounted on the substrate 82*a* are disposed on the substrate 82*a* to face the motor housing 13. Therefore, the plurality of electronic components 82*b* can be disposed compactly on the substrate 82*a* in the axial direction. Thus, the axial length of the substrate 82*a* can be further shortened.

(3) Further, among the plurality of electronic components 82*b*, the electronic component 82*b*1 having a relatively high height is mounted on the front side surface 82*c*2 opposite to the rear side surface 82*c*1 of the substrate 82*a* facing the motor part 10 side. Therefore, it is possible to increase a distance between the motor part 10 and the electronic component 82*b*1 having the relatively high height. Thus, it is possible to suppress an adverse effect due to heat generation from the motor part 10 on the electronic component 82*b*1 having the relatively high height.

(4) Further, the connector portion 82*d* electrically connected to the substrate 82*a* is provided on one side of the substrate 82*a* in the axial direction, and the bus bar 73 connected to the connecting bus bar 35 is electrically connected to the other side of the substrate 82*a* in the axial direction. Therefore, the connector portion 82*d* can be disposed at a position away from a connection point in which the bus bar 73 is connected to the substrate 82*a*. Thus, it is possible to suppress the possibility that noise generated from the bus bar 73 adversely affects the connector portion 82*d*.

(5) Further, the substrate accommodating portion 84 has the placing surface portion 84*a* which is disposed in the axial range of the assembly 45 to face the cylindrical portion 13*d* and on which the substrate 82*a* is placed. The arrangement of the substrate 82*a* with respect to the assembly 45 can be facilitated by disposing the substrate 82*a* in the substrate accommodating portion 84.

(6) Further, the case 50 has the plurality of radiation fins 86 which extend radially outward from the outer surface of the cylindrical portion 13*d* and extend in a direction intersecting the axial direction. Therefore, since the case 50 has the plurality of radiation fins 86, it is possible to increase an area of a portion in which heat is radiated. Thus, it is possible to effectively dissipate the heat generated from the motor part 10 and the heat generated from the substrate 82*a* via the radiation fins 86.

(7) Further, the case 50 has the support portion 77 which extends radially outward from the outer surface of the cylindrical portion 13*d* of the motor housing 13 and connects a pair of radiation fins 86 adjacent to each other in the axial direction. Therefore, since the plurality of radiating fins 86 are integrally connected via the support portion 77, the rigidity of the plurality of radiation fins 86 can be improved.

(8) Further, the case 50 has the plurality of mounting portions 63 mounted on the mounting surface 90*b* provided in the transmission 90 of a vehicle. Therefore, the electric oil pump 1 can be mounted in the transmission 90 by mounting the mounting portion 63 to the mounting surface 90*b* of the transmission 90.

(9) Further, since each of the plurality of mounting portions 63 has the flat surface portion 63*a* which is in surface contact with the mounting surface 90*b*, the mounting portion 63 can be mounted on the mounting surface 90*b* in a state in which the flat surface portion 63*a* is in surface contact with the mounting surface 90*b*. Therefore, it is possible to firmly mount the electric oil pump 1 in the transmission 90.

(10) Further, the support portion 77 has the inter-fin through hole 78 which extends in a direction intersecting the flat surface portion 63*a* and passes through the support portion 77. Therefore, even when a liquid such as oil tries to be stored between the radiation fins 68, it is possible to discharge the liquid to the outside of the electric oil pump 1 via the inter-fin through hole 78.

(11) Further, the plurality of radiating fins 86 are disposed at intervals in the axial direction, and the case 50 has the ribs 88 which connects a pair of radiation fins 86 adjacent to each other in the axial direction. Therefore, the plurality of radiation fins 86 can further enhance the rigidity through the ribs 88.

(12) In addition, the electronic component 82*b*1 having the relatively high height is a capacitor or a choke coil. Therefore, it is possible to suppress the influence of heat generation from the motor part 10 on the capacitor or the choke coil.

Although the exemplary embodiments of the disclosure have been described above, the disclosure is not limited to these embodiments, and various modifications and changes are possible within the scope of the gist thereof. These embodiments and variations thereof are included in the scope and gist of the disclosure and, at the same time, are included in the disclosure described in the claims and the equivalent scope thereof.

What is claimed is:

1. An electric oil pump comprising:
    a motor part having a shaft disposed along a central axis extending in an axial direction;
    a pump part located on one side of the motor part in the axial direction and driven by the motor part via the shaft to discharge oil; and
    a control part which controls an operation of the motor part,
    wherein the motor part includes a rotor fixed to another side of the shaft in the axial direction, a stator disposed to face the rotor, and a motor housing having a cylindrical portion which accommodates the rotor and the stator,
    the pump part includes a pump rotor mounted on the shaft which protrudes from the motor part to one side in the axial direction and a pump housing having an accommodating portion which accommodates the pump rotor,
    the control part includes a plurality of electronic components and a substrate having a surface on which the plurality of electronic components are mounted,
    the surface of the substrate is disposed radially outward from the cylindrical portion of the motor housing to face the motor housing and extends in the axial direction, and
    the substrate has an axial length shorter than an axial length of an assembly formed by combining the motor part and the pump part and is disposed within an axial range of the assembly, wherein the plurality of electronic components mounted on the substrate are disposed on the substrate to face the cylindrical portion of the motor housing, among the plurality of electronic components, an electronic component having a relatively high height is mounted on a front side surface of the surface of the substrate opposite to a rear side surface facing a side of the motor part, the motor housing has a case which extends from an outer surface of the cylindrical portion in a direction orthogonal to the axial direction, the case has a substrate accommodating portion which is located radially outward from the cylindrical portion, extends in the axial direction and accommodates the substrate, the substrate accommodating portion has a placing surface portion which is disposed within an axial range of the assembly to face the cylindrical portion and on which the substrate is placed, and the case has a plurality of radiation fins which extend radially outward from the outer surface of the cylindrical portion and extend in a direction intersecting the axial direction.

2. The electric oil pump according to claim 1, wherein the case has a support portion which extends radially outward from the outer surface of the cylindrical portion of the motor housing and connects a pair of radiation fins adjacent to each other in the axial direction.

3. The electric oil pump according to claim 2, wherein the case has a plurality of mounting portions mounted on a mounting surface provided in a transmission of a vehicle.

4. The electric oil pump according to claim 3, wherein each of the plurality of mounting portions has a flat surface portion which is in surface contact with the mounting surface.

5. The electric oil pump according to claim 4, wherein the support portion has an inter-fin through hole which extends in a direction intersecting the flat surface portion and passes through the support portion.

6. The electric oil pump according to claim 1, wherein:
the plurality of radiation fins are disposed at intervals in the axial direction, and
the case has a rib which connects the pair of radiation fins adjacent to each other in the axial direction.

7. The electric oil pump according to claim 1, wherein the electronic component having a relatively high height is a capacitor or a choke coil.

* * * * *